(12) United States Patent
Yang

(10) Patent No.: US 11,508,334 B2
(45) Date of Patent: Nov. 22, 2022

(54) DISPLAY SCREEN ASSEMBLY, ELECTRONIC DEVICE, AND METHOD FOR DETECTING DISTANCE BETWEEN DISPLAY AREA AND DETECTION OBJECTION

(71) Applicant: GUANGDONG OPPO MOBILE TELECOMMUNICATIONS CORP., LTD., Guangdong (CN)

(72) Inventor: Le Yang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 17/161,180

(22) Filed: Jan. 28, 2021

(65) Prior Publication Data

US 2021/0151006 A1  May 20, 2021

Related U.S. Application Data

(63) Continuation of application No. PCT/CN2019/089891, filed on Jun. 3, 2019.

(30) Foreign Application Priority Data

Jul. 31, 2018 (CN) .......................... 201810860385.7
Jul. 31, 2018 (CN) .......................... 201821225389.X

(51) Int. Cl.
*G06F 3/042* (2006.01)
*G09G 5/10* (2006.01)
(Continued)

(52) U.S. Cl.
CPC .............. *G09G 5/10* (2013.01); *G06F 3/042* (2013.01); *G06F 3/0421* (2013.01); *G09G 3/32* (2013.01);
(Continued)

(58) Field of Classification Search
None
See application file for complete search history.

(56) References Cited

U.S. PATENT DOCUMENTS 7,830,470 B2    11/2010 Liu
2009/0027358 A1*  1/2009 hosono ................. G06F 3/0421
                                                            345/175
(Continued)

FOREIGN PATENT DOCUMENTS

CN    104750320 A    7/2015
CN    106850982 A    6/2017
(Continued)

OTHER PUBLICATIONS

Extended European search report for EP Application 19845380.5 dated Aug. 18, 2021. (9 pages).
(Continued)

*Primary Examiner* — Amr A Awad
*Assistant Examiner* — Donna V Bocar
(74) *Attorney, Agent, or Firm* — Young Basile Hanlon & MacFarlane, P.C.

(57) ABSTRACT

A display screen assembly is provided. The display screen assembly includes a display screen, a first light source, a light conducting member, a receiving element, and a processor. The display screen includes a display region for displaying images and a non-display region surrounding the display region. The light conducting member faces the display region. At least one first light source faces at least one surface of the light conducting member. The at least one first light source is configured to emit a detection signal to the light conducting member. The light conducting member is configured to diffuse the detection signal to allow the detection signal to pass through the display region, to interact with a detection object to form a target signal. The (Continued)

receiving element is disposed in the display region and configured to receive the target signal.

20 Claims, 14 Drawing Sheets

(51) Int. Cl.
*G09G 3/32* (2016.01)
*G01B 7/14* (2006.01)

(52) U.S. Cl.
CPC ....... *G01B 7/14* (2013.01); *G09G 2320/0626* (2013.01); *G09G 2360/16* (2013.01)

(56) References Cited

U.S. PATENT DOCUMENTS

| | | | |
|---|---|---|---|
| 2009/0073360 A1* | 3/2009 | Jeon | G01J 1/44 250/200 |
| 2012/0062817 A1* | 3/2012 | Kanbayashi | G06F 3/042 349/61 |
| 2012/0287085 A1* | 11/2012 | Yuki | G06F 3/04166 345/175 |
| 2012/0320624 A1* | 12/2012 | Yamane | H04M 1/22 362/602 |
| 2014/0062896 A1 | 3/2014 | Vieta | |
| 2014/0085245 A1 | 3/2014 | Baldwin et al. | |
| 2014/0264034 A1* | 9/2014 | Cui | G01J 5/0818 250/341.8 |
| 2015/0220212 A1* | 8/2015 | Kim | G02F 1/13471 345/175 |
| 2015/0346856 A1* | 12/2015 | Wassvik | G06F 3/042 345/175 |
| 2016/0217751 A1* | 7/2016 | Lahti | G06F 3/0421 |
| 2017/0078513 A1 | 3/2017 | Chang et al. | |
| 2019/0219514 A1* | 7/2019 | Atkinson | G08B 21/18 |
| 2021/0223630 A1* | 7/2021 | Ma | H01L 33/60 |

FOREIGN PATENT DOCUMENTS

| | | |
|---|---|---|
| CN | 107748874 A | 3/2018 |
| CN | 108287634 A | 7/2018 |
| CN | 109061922 A | 12/2018 |

OTHER PUBLICATIONS

International search report with English Translation issued in corresponding international application No. PCT/CN2019/089891 dated Aug. 30, 2019.

* cited by examiner

DISPLAY SCREEN ASSEMBLY, ELECTRONIC DEVICE, AND METHOD FOR DETECTING DISTANCE BETWEEN DISPLAY AREA AND DETECTION OBJECTION

CROSS-REFERENCE TO RELATED APPLICATION(S)

This application is a continuation of International Application No. PCT/CN2019/089891, filed on Jun. 3, 2019, which claims priority to Chinese Patent Application Serial No. 201810860385.7, filed on Jul. 31, 2018 and Chinese Patent Application Serial No. 201821225389.X, filed on Jul. 31, 2018, the disclosures of all of which are hereby incorporated by reference in their entireties.

TECHNICAL FIELD

The present disclosure relates to the field of electronic technology, and particularly to a display screen assembly, an electronic device, and a method for controlling the electronic device.

BACKGROUND

Generally, users interact with electronic elements in an electronic device via a display screen, and the electronic elements occupy a non-display region of the display screen, which is not beneficial to achieving the full screen of the electronic device. Therefore, with increasing demand for a screen-to-body ratio of an electronic device, how to reduce an area of the non-display region of the display screen occupied by the electronic elements to increase the screen-to-body ratio of the electronic device has become a problem to be solved

SUMMARY

The present disclosure provides a display screen assembly, an electronic device, and a method for controlling the electronic device, so as to increase a screen-to-body ratio.

In an aspect, there is provided a display screen assembly. The display screen assembly includes a display screen, a light conducting member, at least one first light source, a receiving element, and a processor. The display screen includes a display region for displaying images and a non-display region surrounding the display region. The light conducting member faces the display region. The at least one first light source faces at least one surface of the light conducting member. The at least one first light source is configured to emit a detection signal to the light conducting member. The light conducting member is configured to diffuse the detection signal to allow the detection signal to pass through the display region, to interact with a detection object to form a target signal. The processor is electrically coupled with the at least one first light source and the receiving element. The processor is configured to detect a distance between the display region and the detection object according to one of an intensity of the target signal and a difference between a transmission time of the detection signal and a reception time of the target signal.

In another aspect, there is provided an electronic device. The electronic device includes the above-mentioned display screen assembly.

In an aspect, there is provided a method for controlling an electronic device. The method includes the following. A processor controls at least one first light source to emit a detection signal, the detection signal is capable of interacting with a detection object to form a target signal. The processor controls the receiving element to receive the target signal. The processor detects a distance between a display region and the detection object according to one of an intensity of the target signal and a difference between a transmission time of the detection signal and a reception time of the target signal.

BRIEF DESCRIPTION OF DRAWINGS

To describe the technical solutions in the implementations of the present disclosure more clearly, the following briefly introduces the accompanying drawings required for describing the implementations. Apparently, the accompanying drawings in the following description illustrate some implementations of the present disclosure. Those of ordinary skill in the art may also obtain other drawings based on these accompanying drawings without creative efforts.

DETAILED DESCRIPTION

Figure 1:
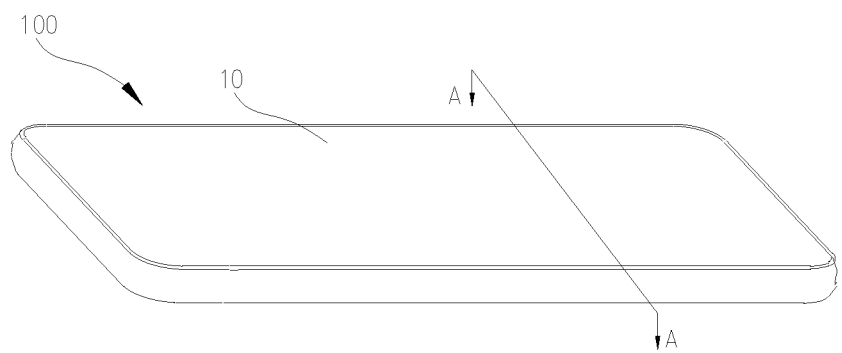
FIG. 1 is a schematic structural view of an electronic device according to an implementation of the present disclosure.

Technical solutions in implementations of the present disclosure will be described clearly and completely hereinafter with reference to the accompanying drawings.

The disclosure relates to a display screen assembly. The display screen assembly includes a display screen, a light conducting member, at least one first light source, multiple second light sources, a receiving element, and a processor. The display screen includes a display region for displaying images and a non-display region surrounding the display region. The light conducting member faces the display region. The at least one first light source faces at least one surface of the light conducting member. The at least one first light source is configured to emit a detection signal to the light conducting member. The light conducting member is configured to diffuse the detection signal to allow the detection signal to pass through the display region, to interact with a detection object to form a target signal. The multiple second light sources are configured to provide backlight for the display screen assembly. The receiving element is disposed in the display region and configured to receive the target signal. The processor is electrically coupled with the at least one first light source and the receiving element. The processor is configured to detect a distance between the display region and the detection object according to one of an intensity of the target signal and a difference between a transmission time of the detection signal and a reception time of the target signal.

In at least one implementation, the display screen assembly further includes a first flexible circuit board. The first flexible circuit board faces at least one surface of the light conducting member. The at least one first light source and the multiple second light sources are spaced apart on the first flexible circuit board and electrically coupled with the first flexible circuit board.

In at least one implementation, the light conducting member includes a first surface and a second surface opposite to the first surface. The first surface faces the display region, and the second surface faces the first flexible circuit board. The at least one first light source and the multiple second light sources are located on a side of the first flexible circuit board close to the light conducting member.

In at least one implementation, the display region includes multiple pixel regions arranged in an array. Each of the multiple pixel regions has a light transparent portion and a black matrix surrounding the light transparent portion. Each of the at least one first light source faces the light transparent portion.

In at least one implementation, an orthographic projection of the light transparent portion of each of the multiple pixel regions on the first flexible circuit board covers a corresponding one of the at least one first light source.

In at least one implementation, the receiving element includes multiple receiving elements. Each of the multiple receiving elements is disposed in the light transparent portion of a corresponding one of the multiple pixel regions. An orthographic projection of each of the multiple receiving elements on the first flexible circuit board is spaced apart from a corresponding one of the at least one first light source.

In at least one implementation, each of the at least one first light source is a mini LED or a micro LED for emitting infrared lights. Each of the multiple second light sources is a mini LED or a micro LED for emitting visible lights. The light conducting member includes a diffusion film and a brightness enhancement film stacked with the diffusion film. The diffusion film is configured to change a transmission angle of optical signals which are transmitted into the diffusion film.

In at least one implementation, the light conducting member includes a first surface, a second surface opposite to the first surface, and a side surface connected between the first surface and the second surface. The first surface faces the display region, the side surface facing the first flexible circuit board. The at least one first light source and the multiple second light sources are located on a side of the first flexible circuit board close to the light conducting member.

In at least one implementation, the light conducting member is a light guide plate. The side surface defines multiple grooves. Each of the at least one first light source is located in a corresponding one of the multiple grooves. Each of the multiple grooves has an arc inner wall.

In at least one implementation, the display screen assembly further includes a second flexible circuit board and a third flexible circuit board. The second flexible circuit board faces at least one surface of the light conducting member. The at least one first light source includes multiple first light sources, which are located on the second flexible circuit board and electrically coupled with the second flexible circuit board. The third flexible circuit board is located to a side of the second flexible circuit board away from the light conducting member. The multiple the second light sources are located on the third flexible circuit board and electrically coupled with the third flexible circuit board. Each of the multiple the second light sources faces a gap between corresponding adjacent two of the multiple first light sources.

In at least one implementation, the second flexible circuit board is made of a light transparent material. Light emitted by each of the multiple second light sources is capable of reaching the outside of the display screen after passing through the second flexible circuit board and the light conducting member in sequence.

In at least one implementation, the display screen assembly further includes a filter cover. The filter cover is disposed on the multiple second light sources and configured to filter out the detection signal in signals emitted by the multiple second light sources.

In at least one implementation, the display screen assembly further includes a first control circuit and a second control circuit. The first control circuit is electrically coupled with the at least one first light source and the receiving element and is configured to control the at least one first light source to emit the detection signal and to control the receiving element to receive the target signal. The second control circuit is electrically coupled with the multiple second light sources and is configured to control the multiple second light sources to turn on or turn off the display screen.

In at least one implementation, the at least one first light source is configured to transmit a first electrical signal to the processor upon transmission of the detection signal. The processor is configured to receive the first electrical signal and obtain a first time point at which the first electrical signal is received. The receiving element is configured to transmit a second electrical signal to the processor upon reception of the target signal. The processor is configured to receive the second electrical signal and obtain a second time point at which the second electrical signal is received. The processor is configured to obtain a distance between the detection object and the display region according to a difference between the first time point and the second time point, to control the second control circuit to turn on or turn off the multiple second light sources.

In at least one implementation, the receiving element is configured to transmit a third electrical signal to the processor upon reception of the target signal. The third electrical signal has an intensity corresponding to that of the target signal. The processor is configured to obtain a distance between the detection object and the display region according to the intensity of the third electrical signal received, to control the second control circuit to turn on or turn off the multiple second light sources.

In at least one implementation, the display screen assembly further includes a switching element. The switching element is electrically coupled with the processor and the receiving element. The processor is configured to turn off the switching element to power off the receiving element, upon transmission of the detection signal by the at least one first light source. The processor is configured to turn on the switching element to control the receiving element to receive the target signal, upon completion of the transmission of the detection signal by the at least one first light source.

In at least one implementation, the display screen assembly further includes a light-shielding member. The light-shielding member is located between the receiving element and the at least one first light source and faces the receiving element. The light shielding member is configured to prevent the detection signal emitted by the at least one first light source from being directly transmitted toward the receiving element.

In at least one implementation, the display region includes multiple pixel regions and multiple thin film transistors. Each of the multiple thin film transistors is located in a corresponding one of the multiple pixel regions. Each of multiple receiving elements is located in a corresponding one of the multiple pixel regions. The receiving element is adjacent to or diagonally opposite to the thin film transistor that is in the same pixel region as the receiving element.

The disclosure further relates to an electronic device. The electronic device includes a housing and a display screen assembly covered on the housing. The display screen assembly includes a display screen, a light conducting member, at least one first light source, multiple second light sources, a receiving element, and a processor. The display screen includes a display region for displaying images and a non-display region surrounding the display region. The light conducting member faces the display region. The at least one first light source faces at least one surface of the light conducting member. The at least one first light source is configured to emit a detection signal to the light conducting member. The light conducting member is configured to diffuse the detection signal to allow the detection signal to pass through the display region, to interact with a detection object to form a target signal. The multiple second light sources are configured to provide backlight for the display screen assembly. The receiving element is disposed in the display region and configured to receive the target signal. The processor is electrically coupled with the at least one first light source and the receiving element. The processor is configured to detect a distance between the display region and the detection object according to one of an intensity of the target signal and a difference between a transmission time of the detection signal and a reception time of the target signal.

The disclosure further relates to a method for controlling an electronic device. The method includes the following. Control at least one first light source of the electronic device to emit a detection signal, the detection signal is capable of interacting with a detection object to form a target signal. Control a receiving element of the electronic device to receive the target signal. Detect a distance between a display region of the electronic device and the detection object according to one of an intensity of the target signal and a difference between a transmission time of the detection signal and a reception time of the target signal.

Figure 2:
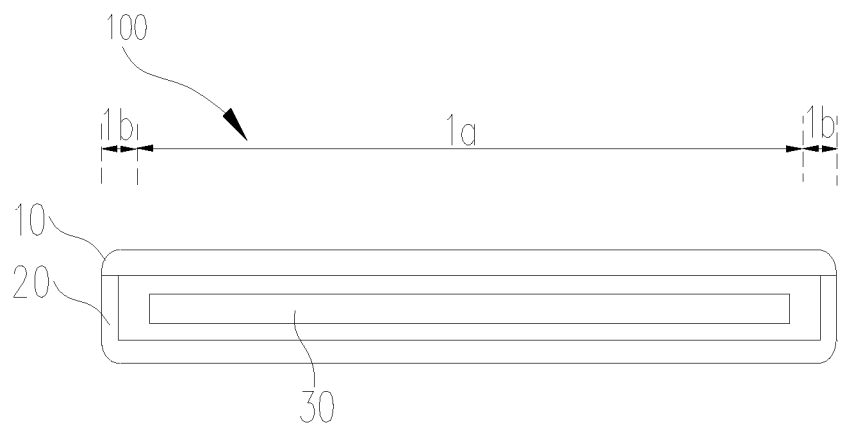
FIG. 2 is a cross-sectional view of the electronic device taken along line A-A in FIG. 1.

Referring to FIG. 1 and FIG. 2, an electronic device 100 is provided. The electronic device 100 includes a display screen assembly 10, a housing 20, and an electronic component 30. The display screen assembly 10 is covered on the housing 20. The electronic component 30 is received in a space surrounded by the display screen assembly 10 and the housing 20. The electronic device 100 may be an electronic product with display function, such as a mobile phone, a laptop, a palmtop computer, an e-reader, a television, a smart appliance, a smart screen, a smart home, a wearable electronic device, and an on-board display.

Figure 3:
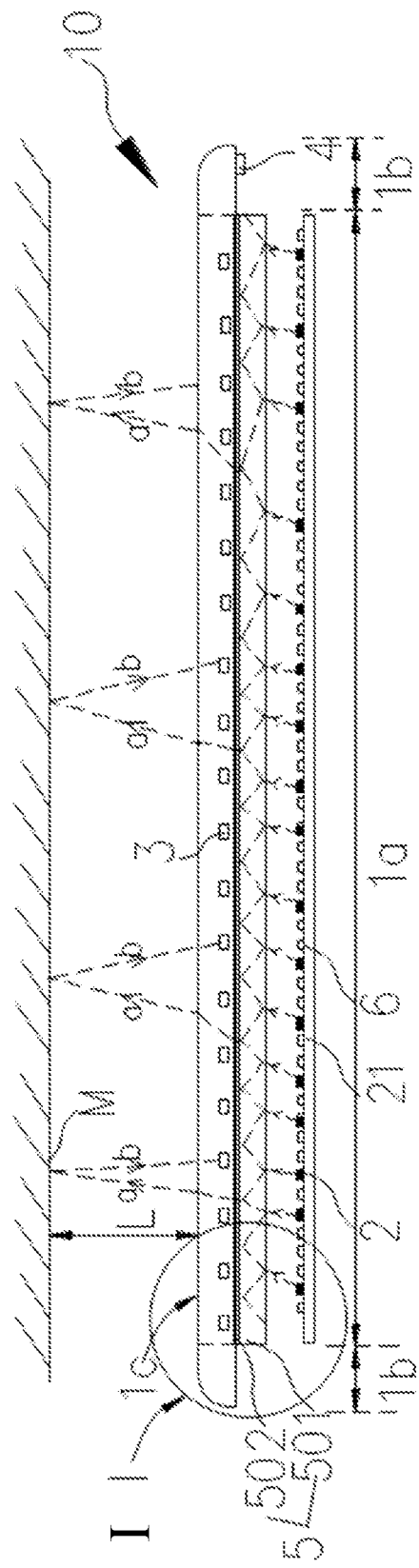
FIG. 3 is a schematic diagram of signal transmission and reception through a display screen assembly according to an implementation of the present disclosure.
Figure 4:
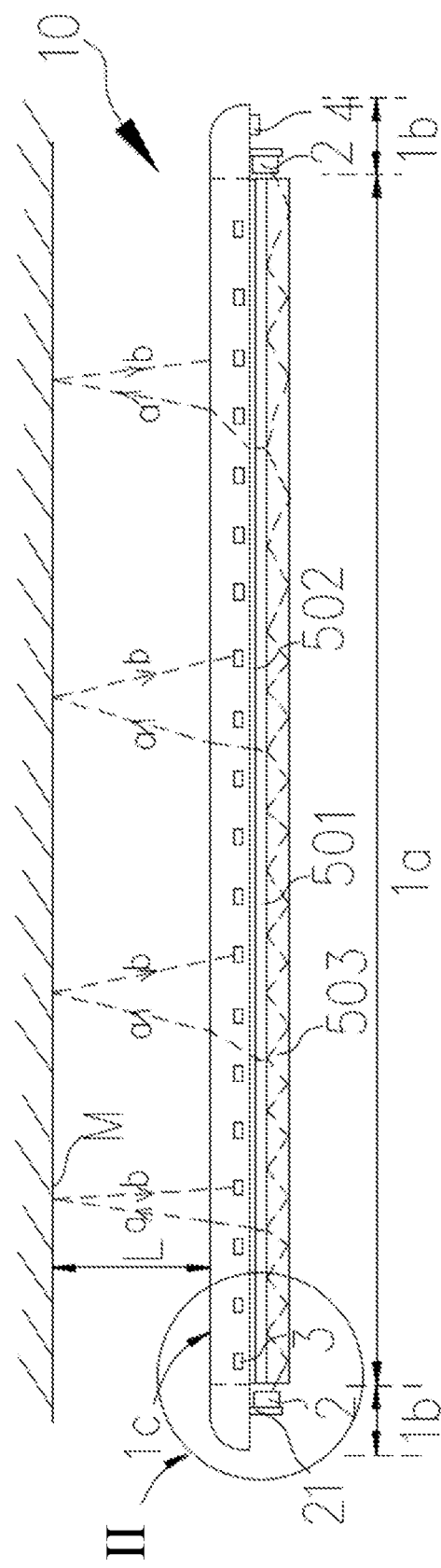
FIG. 4 is a schematic diagram of signal transmission and reception through a display screen assembly according to an implementation of the present disclosure.

FIG. 3 illustrates the display screen assembly 10 according to the present disclosure. The display screen assembly 10 includes a display screen 1, at least one first light source 2, a receiving element 3, a processor 4, a light conducting member 5, and multiple second light sources 6. Referring to FIG. 3 and FIG. 4, the light conducting member 5 faces a display region 1a. The at least one first light source 2 directly faces at least one surface of the light conducting member 5. The at least one first light source 2 is configured to emit a detection signal a to the light conducting member 5. The light conducting member 5 is configured to transfer or propagate the detection signal a. The light conducting member 5 is configured to diffuse the detection signal a, so as to allow the detection signal a to pass through the display region 1a to exit from the display region 1a, and then to interact with a detection object M to form a target signal b. The detection object M faces a light-emitting surface 1c of the display screen 1. The receiving element 3 is disposed in the display region 1a and configured to receive the target signal b. The second light source 6 is configured to provide backlight for the display screen assembly 10.

The processor 4 is electrically coupled with the first light source 2 and the receiving element 3. The processor 4 is configured to detect a distance L between the display region 1a and the detection object M according to an intensity of the target signal b and a difference between a transmission time of the detection signal a and a reception time of the target signal b.

In an implementation, the display screen 1 has the display region 1a and a non-display region 1b surrounding the display region 1a. The display region 1a is configured to display images. The display screen 1 includes the display region 1a and the non-display region 1b surrounding the display region 1a. Electronic components with light-emitting and display functions are disposed in the display region 1a, allowing the display region 1a to display images. Electrical connecting wires are disposed in the non-display region 1b. The electrical connecting wires are configured to control and drive the electronic components which have light-emitting and display functions.

It is noted that, in implementations of the present disclosure, the light conducting member 5 may refer to an optical assembly for propagating lights.

In an implementation, the light conducting member 5 can cover the at least one first light source 2 (see FIG. 3). Alternatively, the first light source 2 can directly face a side surface of the light conducting member 5 (see FIG. 4).

It is noted that, in an implementation, multiple first light sources 2 and multiple second light sources 6 are provided, where some of the multiple first light sources and the multiple second light sources 6 directly face a side surface of the light conducting member 5 and the rest of the multiple first light sources and the multiple second light sources 6 directly face a bottom surface of the light conducting member 5 (that is, a surface of the light conducting member 5 parallel to the display region 1a). In this way, the display screen 1 may has a high brightness and a compact structure.

The first light source 2 and the receiving element 3 are disposed in the display screen assembly 10, the first light source 2 and the receiving element 3 cooperate to detect the distance L between the display screen 1 and the detection object M, such that the electronic device 100 can perform operations such as turning screen off, turning screen on, and unlocking screen. The receiving element 3 is disposed in the display region 1a, the receiving element 3 does not occupy the non-display region 1b and does not affect the display region 1a, such that the area of the non-display region 1b can be further reduced, thereby increasing a screen-to-body ratio of the display screen assembly 10. The first light source 2 is disposed in the non-display region 1b, the light conducting member 5 is configured to propagate the detection signal a emitted by the first light source 2 to the display region 1a, to increase a radiation area of the detection signal a and improve distance detection efficiency.

The display screen 1 can be covered with a transparent cover plate as a protective layer. The first light source 2 is disposed in the non-display region 1b and the receiving element 3 is disposed in the display region 1a, and there is a distance between the first light source 2 and the receiving element 3, so as to prevent the detection signal which is emitted by the first light source 2 from being reflected by the transparent cover plate and received by the receiving element 3, to avoid interference with the target signal b received by the receiving element 3 and reduce detection accuracy of the electronic device 100.

It is noted that an area of the light conducting member 5 may be greater than or equal to that of the display region 1a, such that light emitted from the light conducting member 5 can illuminate the entire display region 1a.

In an implementation, each of the first light source 2 and the second light source 6 can be a mini LED, a micro LED, or the like. Each of the first light source 2 and the second light source 6 has a size of 1~500 um. The first light source 2 and the second light source 6 can be packaged on a flexible circuit board. The first light source 2 and the second light source 6 can be a mini LED or a micro LED, which is possible to reduce a size of each light source itself and a distance between light sources, such that more light sources can be arranged and brightness and uniformity of all light sources (that is, the first light source 2 and the second light source 6) can be improved.

In an implementation, the light conducting member 5 is configured to diffuse uniformly the light emitted from the first light source 2 and the second light source 6 to propagate the light to the outside. The light conducting member 5 can be made of a transparent material to allow the detection signal a emitted by the first light source 2 and a light signal emitted by the second light source 6 to pass through.

It is noted that, the processor 4 is electrically coupled with the first light source 2 and the receiving element 3. The processor 4 may be located in the non-display region 1b. Alternatively, the processor 4 may be located in the display region 1a without affecting displaying.

In this implementation, the first light source 2 and the receiving element 3 can be used for distance detection, blood oxygen detection, heart rate detection, body temperature detection, remote control, gesture recognition, face recognition, and the like. For example, in an implementation, the detection signal a emitted by the first light source 2 is reflected by a surface of the detection object M in front of the display region 1a and then received by the receiving element 3, such that the processor 4 can obtain the distance L between the display region 1a and the detection object M. In an implementation, the detection signal a emitted by the first light source 2 is projected to and reflected by a surface of the blood vessel, and then is received by the receiving element 3, such that the processor 4 can obtain blood oxygen information and heart rate information. In an implementation, the detection signal a emitted by the first light source 2 is projected to and reflected by a skin surface, and then is received by the receiving element 3, such that the processor 4 can obtain body temperature information. In an implementation, the detection signal a emitted by the first light source 2 is projected to and received by an electronic component, such that the processor 4 can control the electronic component. In an implementation, the detection signal a emitted by the first light source 2 is projected to and reflected by the hand and then is received by the receiving element 3, such that the processor 4 can obtain change information of the hand, thereby realizing gesture recognition. In an implementation, the detection signal a emitted by the first light source 2 is projected to and reflected by the face and then is received by the receiving element 3, such that the processor 4 can obtain face information and compare it with preset information, thereby realizing face recognition.

In an implementation, the first light source 2 may be an infrared light-emitting diode or an infrared light-emitting triode. The receiving element 3 may be an infrared light-receiving diode or an infrared light-receiving triode. The detection signal a may be infrared light. As an example, the detection signal may have a wavelength of 960 nm. In other implementations, the detection signal a may also be near-infrared light.

In other implementations, the first light source 2 may also be an ultraviolet light-emitting diode or an ultraviolet light-emitting triode. The receiving element 3 may be an ultraviolet light-receiving diode or an ultraviolet light-receiving triode. The detection signal is ultraviolet light or near ultraviolet light.

In an implementation, the detection signal a may also be any combination of infrared light, near-infrared light, ultraviolet light, and near-ultraviolet light.

In an implementation, the second light source 6 may be an LED, and the second light source 6 is configured to emit visible lights.

Figure 5:
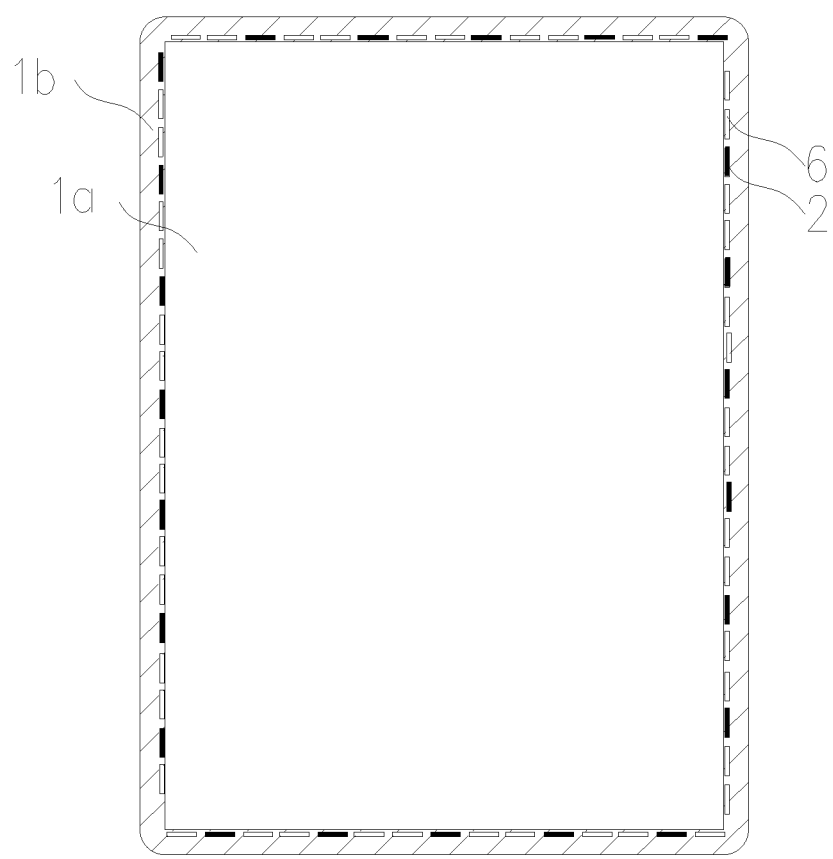
FIG. 5 is a top view of the display screen assembly illustrated in FIG. 4.

In an implementation, referring to FIG. 5, the at least one first light source 2 and the multiple second light sources 6 may be arranged around the display region 1a. N second light sources 6 are located between two adjacent first light sources 2, N can be an integer greater than or equal to one.

Figure 6:
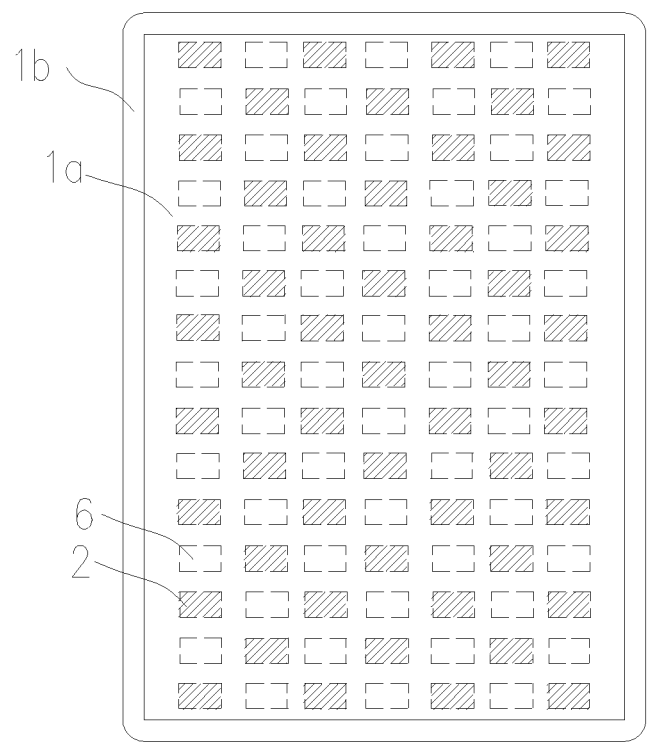
FIG. 6 is a top view of receiving elements in a display screen assembly in a first distribution mode according to an implementation of the present disclosure.

In an implementation, referring to FIG. 6, the multiple second light sources 6 may also be tiled in rows and columns in an array. The at least one first light source 2 may be located in gaps defined in the array. Alternatively, the at least one first light source 2 may also be arranged to replace some second light sources 6 in the array.

Figure 7:
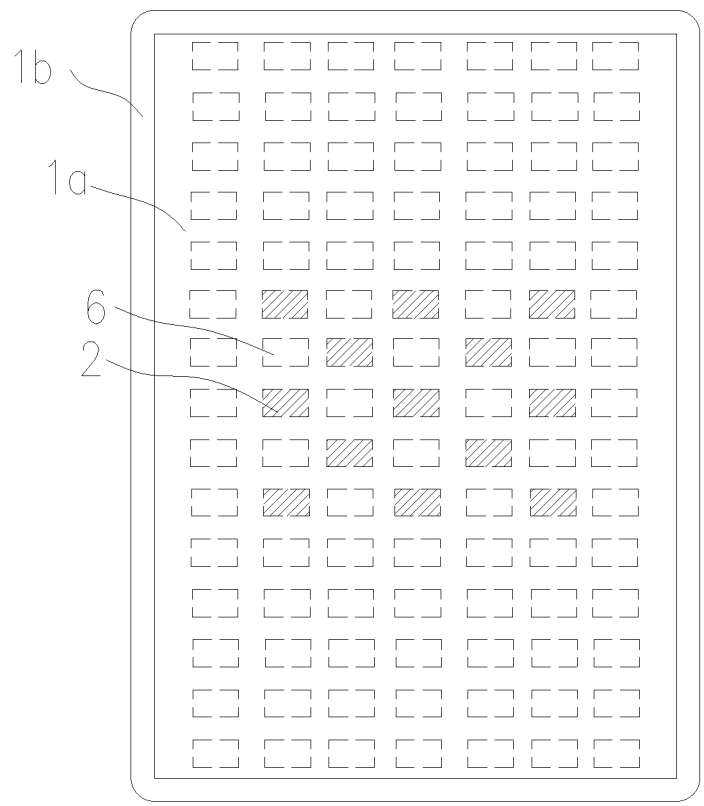
FIG. 7 is a top view of receiving elements in a display screen assembly in a second distribution mode according to an implementation of the present disclosure.
Figure 8:
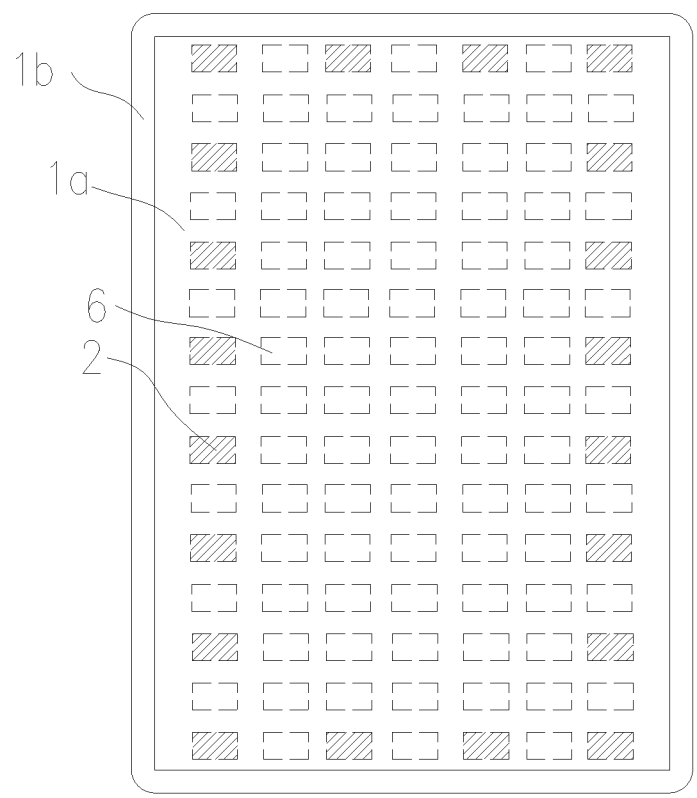
FIG. 8 is a top view of receiving elements in a display screen assembly in a third distribution mode according to an implementation of the present disclosure.

In an implementation, referring to FIG. 6, the first light source 2 may directly face the entire display region 1a. Alternatively, referring to FIG. 7, the at least one first light source 2 may be located directly facing the center of the display region 1a. Alternatively, referring to FIG. 8, the at least one first light source 2 may be located directly facing a part of the display region 1a which is adjacent to the non-display region 1b. That is, the at least one first light source 2 is located at an edge of the display region 1a, and alternatively, the at least one first light source 2 may be located directly facing corners of the display region 1a.

In some implementations, referring to FIG. 3 and FIG. 4, the display screen assembly 10 further includes a first flexible circuit board 21. The first flexible circuit board 21 faces at least one surface of the light conducting member 5. The at least one first light source 2 and the multiple second light sources 6 are spaced apart on the first flexible circuit board 21 and electrically coupled with the first flexible circuit board 21. That is, in the at least one first light source 2 and the multiple second light sources 6, any adjacent two light sources are spaced apart from each other. The at least one first light source 2 and the multiple second light sources 6 are located between the first flexible circuit board 21 and the light conducting member 5, to allow the detection signal a emitted by the first light source 2 to enter the light conducting member 5. In implementations, the at least one first light source 2 and the multiple second light sources 6 are located on a side of the first flexible circuit board 21 close to the light conducting member 5. The light conducting member 5 is configured to diffuse the detection signal a, to allow the detection signal a to pass through the entire display region 1a to the outside, thereby increasing a radiation area of the detection signal a, and increasing the detection efficiency of the electronic device 100.

In an implementation, referring to FIG. 3, the first flexible circuit board 21 may face a side of the light conducting member 5 away from the display screen 1. Alternatively, referring to FIG. 4, the first flexible circuit board 21 may face a side surface of the light conducting member 5.

The first light source 2 and the second light source 6 are electrically with the same flexible circuit board, such that less flexible circuit boards are required, and the electronic device 100 has a more rational layout. At the same time, the flexible circuit board also plays a role of carrying the first light source 2 and the second light source 6.

It is noted that the first flexible circuit board 21 may be carried on a supporting board to allow the first flexible circuit board 21 to have a sufficient structural strength, so as to support the first light source 2 and the second light source 6.

Figure 9:
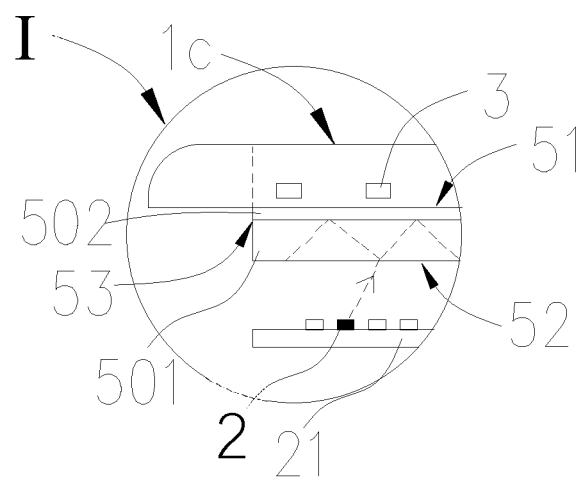
FIG. 9 is a partially enlarged view of structure in circle I in FIG. 3.

In an implementation, referring to FIG. 9, the light conducting member 5 includes a first surface 51, a second surface 52 opposite to the first surface 51, and a side surface 53 connected between the first surface 51 and the second surface 52. The first surface 51 faces the display region 1a. The first flexible circuit board 21 faces the second surface 52 of the light conducting member 5. The at least one first light source 2 and the multiple second light sources 6 are located between the first flexible circuit board 21 and the second surface 52 of the light conducting member 5. In implementations, the at least one first light source and the multiple second light sources are located on the side of the first flexible circuit board 21 close to the light conducting member 5.

It is noted that, the first surface 51 acts as a light-incident surface, and the second surface 52 acts as a light-emitting surface. The first light source 2 and the second light source 6 face the display region 1a.

In an implementation, referring to FIG. 3, the first light source 2 is a mini LED or micro LED for emitting infrared lights. The second light source 6 is a mini LED or micro LED for emitting visible lights. The light conducting member 5 may include a diffusion film 501 and a brightness enhancement film 502 stacked with the diffusion film 501. The diffusion film 501 is located between the brightness enhancement film 502 and the at least one first light source 2 as well as the multiple second light sources 6. The diffusion film 501 is configured to change a transmission angle of optical signals, such that the optical signals are uniformly distributed when transmitted in the diffusion film 501. The brightness enhancement film 502 is configured to converge light signals from various directions to a direction perpendicular to the display screen 1 for propagation. In an implementation, the brightness enhancement film 502 may include an upper brightness enhancement film and a lower brightness enhancement film stacked with the upper brightness enhancement film.

Each of the first light source 2 and the second light source 6 is a mini LED or micro LED, more first light sources 2 and more second light sources 6 can be disposed on the flexible circuit board due to a relatively small size of the first light source 2 and the second light source 6. In this way, the at least one first light source 2 and the multiple second light sources 6 are densely distributed, lights emitted by the at least one first light source 2 and the multiple second light sources 6 have a strong brightness and uniform distribution, as such, there is no need to provide a light guide plate for guiding the lights emitted by the at least one first light source 2 and the multiple second light sources 6 and a reflector for reflecting the lights emitted by at least one first light source 2 and the multiple second light sources 6, thereby reducing a thickness of the display screen assembly 10.

In other implementations, the light conducting member 5 can also include a light guide plate. The light guide plate may be arranged between the at least one first light source 2 and the diffusion film 501. The light guide plate is used to increase uniformity of the light signals. The light guide plate may be made of optical grade polycarbonate, optical grade polymethyl methacrylate, and the like.

The second light source 6 can act as a backlight source of the display screen 1. The first light source 2 is disposed between the second light sources 6 which act as the backlight sources, and there is no need to provide an additional position for the first light source 2, so as to save space within the electronic device 100. In addition, the first light source 2 and the second light source 6 can share the flexible circuit board, a driving circuit, and the like, reducing the number of components in the electronic device 100, simplifying design of the electronic device 100, and improving detection performance of the electronic device 100.

Figure 10:
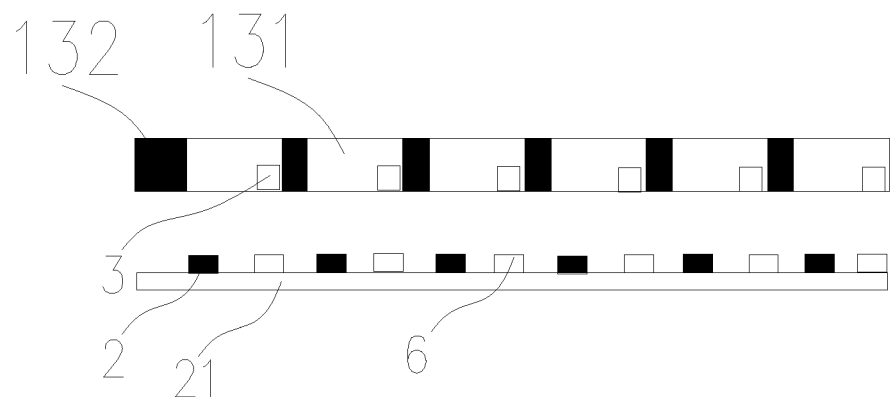
FIG. 10 is a partially cross-sectional view of the display screen assembly illustrated in FIG. 9.

In an implementation, referring to FIG. 10, the display region 1a includes multiple pixel regions 13 arranged in an array. Each pixel region 13 has a light transparent portion 131 and a black matrix 132. The black matrix 132 surrounds the light transparent portion 131. The at least one first light source 2 faces the light transparent portion 131 to allow the detection signal a to reach the outside of the display screen 1 after passing through the light transparent portion 131.

The first light source 2 directly faces the light transparent portion 131, such that the detection signal a emitted by the first light source 2 can directly pass through the light conducting member 5 and the light transparent portion 131 and then reach the outside of the display region 1a. Thus, blocking of the detection signal a by the black matrix 132 is reduced, so that more detection signals a can reach the outside of the display region 1a more quickly, thereby improving the detection efficiency of the electronic device 100.

Further, referring to FIG. 10, an orthographic projection of one pixel region 13 on the first flexible circuit board 21 covers a corresponding one of the at least one first light source 2. In other words, the first light source 2 may have a size smaller than the pixel region 13 facing the first light source 2. Further, the first light source 2 may have a size smaller than or equal to that of the light transparent portion 131 of the pixel region 13 facing the first light source 2. In this way, the detection signal a emitted by the first light source 2 can reach the outside after passing through the light transparent portion 131 corresponding to the first light source 2, and blocking in the detection signal a can be reduced.

In an implementation, referring to FIG. 10, the receiving element 3 is embodied as multiple receiving elements. Each of the multiple receiving elements 3 is disposed in the light transparent portion 131 of a corresponding one of the multiple pixel regions 13. An orthographic projection of each of the multiple receiving elements 3 on the first flexible circuit board 21 is spaced apart from a corresponding one of the at least one first light source 2 (that is, the orthographic projection of each of the multiple receiving elements 3 on the first flexible circuit board 21 does not overlap with the corresponding one of the at least one first light source 2), so as to reduce shielding of the detection signal a emitted from the first light source 2 caused by the receiving element 3.

Figure 11:
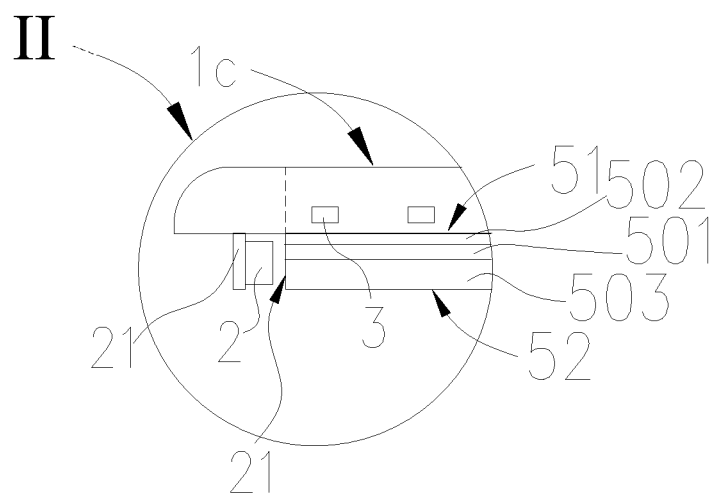
FIG. 11 is a partially enlarged view of structure in circle II in FIG. 4.
Figure 12:
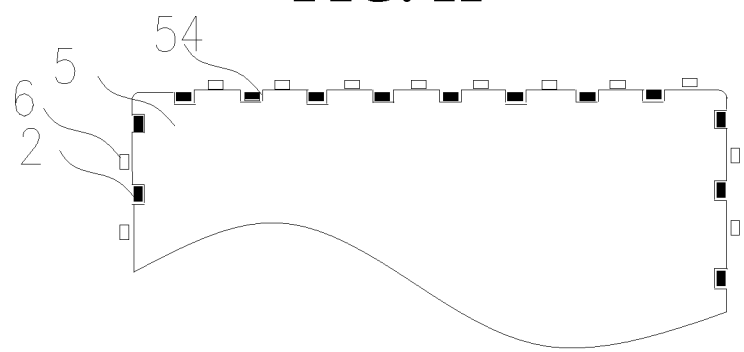
FIG. 12 is a partially cross-sectional view of the display screen assembly illustrated in FIG. 11.

In an implementation, referring to FIG. 4, FIG. 11, and FIG. 12, the light conducting member 5 includes a first surface 51, a second surface 52 opposite to the first surface 51, and a side surface 53 connected between the first surface 51 and the second surface 52. The first surface 51 directly faces the display region 1a. The side surface 53 of the light conducting member 5 directly faces the first flexible circuit board 21. The at least one first light source 2 and the multiple second light sources 6 are located between the first flexible circuit board 21 and the side surface 53 of the light conducting member 5. In implementations, the at least one first light source 2 and the multiple second light sources 6 are located on a side of the first flexible circuit board 21 close to the light conducting member 5. In other words, the first light source 2 and the second light source 6 are located close to the side surface 53 of the light conducting member 5, such that the thickness of the display screen assembly 10 can be reduced.

In an implementation, referring to FIG. 4, the light conducting member 5 may include the diffusion film 501, the brightness enhancement film 502, and a light guide plate 503 stacked in sequence. The light guide plate 503 is disposed on a side of the diffusion film 501 away from the display screen 1. The first light source 2 faces a side of the light guide plate 503. The light guide plate 503 is used to increase the uniformity of the optical signals. The light guide plate 503 may be made of optical grade polycarbonate, optical grade polymethyl methacrylate, and the like. The diffusion film 501 is located between the light guide plate 503 and the brightness enhancement film 502. The diffusion film 501 is located between the brightness enhancement film 502 and the first light source 2. The diffusion film 501 is configured to change the transmission angle of the optical signals, such that the optical signals are uniformly distributed when transmitted in the diffusion film 501. The brightness enhancement film 502 is configured to converge the light signals from various directions to a direction perpendicular to the display screen 1 for propagation. In an implementation, the brightness enhancement film 502 may include an upper brightness enhancement film and a lower brightness enhancement film stacked with the upper brightness enhancement film.

Further, referring to FIG. 12, the side surface 53 defines multiple grooves 54. Each of the multiple grooves 54 corresponds to a corresponding one of the at least one first light source 2. Each first light source 2 is located in a corresponding groove 54. An inner wall of the groove 54 half-surrounds the first light source 2, such that the detection signal a emitted from the first light source 2 is incident into the light conducting member 5 as much as possible, thereby reducing loss of the detection signal a. Further, the inner wall of the groove 54 is in an arc shape. The inner wall of the groove 54 can diffuse the detection signals a into the light conducting member 5, such that the detection signals a exit from substantially the entire light-emitting surface of the light conducting member 5, thereby increasing a light-emitting area for the detection signals a.

The second light source 6 is located outside the groove 54. In other words, the first light source 2 can be interleaved with the second light source 6, which can reduce an interference between the detection signal a emitted from the first light source 2 and the optical signal emitted from the second light source 6.

Figure 13:
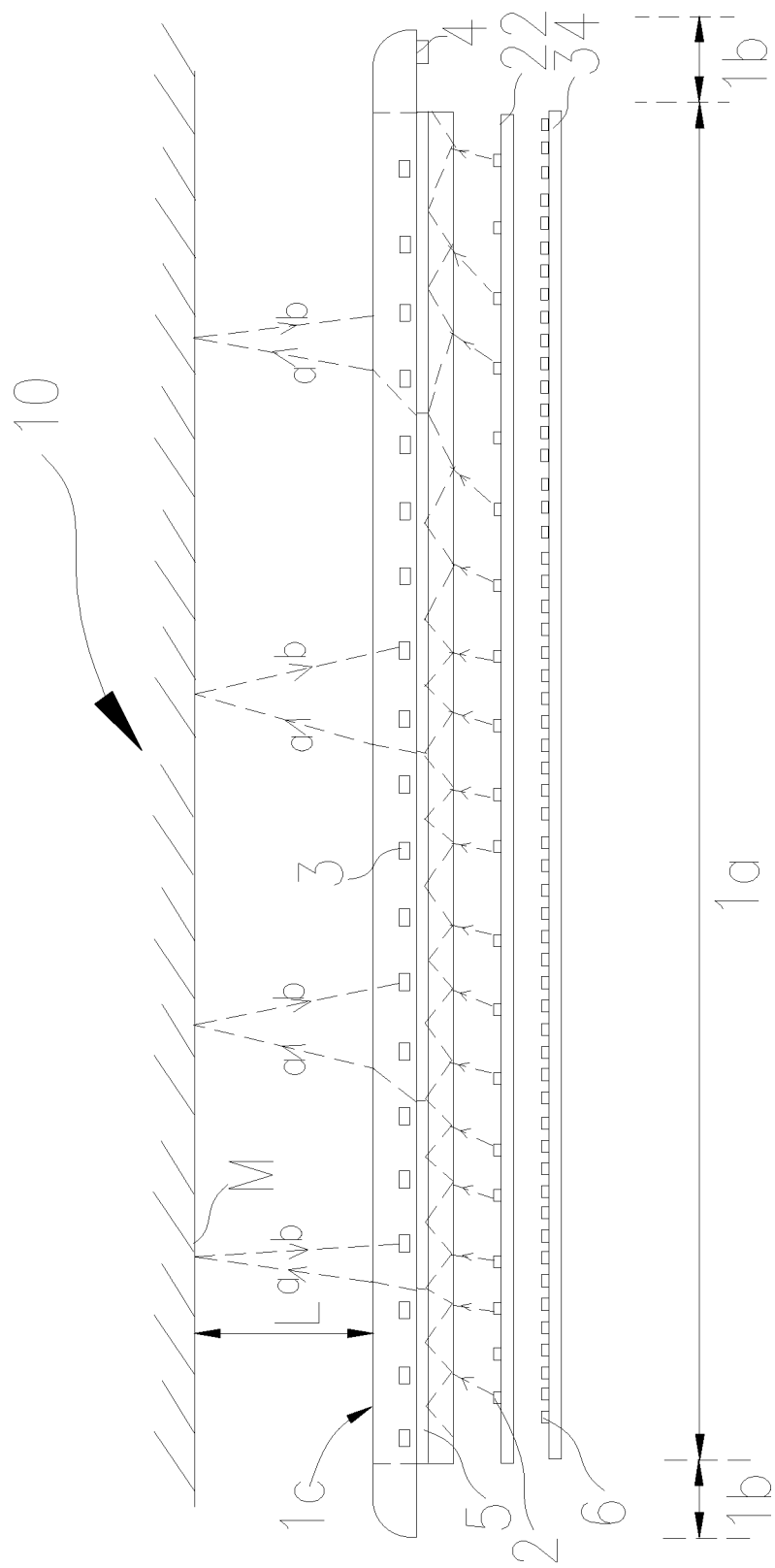
FIG. 13 is a schematic diagram of signal transmission and reception through a display screen assembly according to an implementation of the present disclosure.

In an implementation, referring to FIG. 13, the display screen assembly 10 includes a second flexible circuit board 22 and a third flexible circuit board 34. The second flexible circuit board 22 faces at least one surface of the light conducting member 5. The at least one first light source 2 is embodied as multiple first light sources 2, which are located on the second flexible circuit board 22 and electrically connected with the second flexible circuit board 22. The third flexible circuit board 34 is located at a side of the second flexible circuit board 22 away from the light conducting member 5. The multiple second light sources 6 are located on the third flexible circuit board 34 and electrically coupled with the third flexible circuit board 34. Each of the multiple second light sources 6 faces a gap between corresponding adjacent two of the multiple first light sources 2. In other words, the light conducting member 5, the second flexible circuit board 22, and the third flexible circuit board 34 are stacked at intervals. The first light source 2 is located between the light conducting member 5 and the second flexible circuit board 22. The second light source 6 is located between the second flexible circuit board 22 and the third flexible circuit board 34. In implementations, the first light source 2 is located on a side of the second flexible circuit board 22 close to the light conducting member 5, and the second light source 6 is located on a side of the third flexible circuit board 34 close to the second flexible circuit board 22. In this way, more first light sources 2 can be disposed on the second flexible circuit board 22, and more second light sources 6 can be disposed on the third flexible circuit board 34, compared with the arrangement where the first light sources 2 and the second light sources 6 are disposed on the same flexible circuit board and spacing between light sources are required, the number of the first light sources 2 and the number of the second light sources 6 will not be restricted. Furthermore, the first light sources 2 are uniformly disposed on the second flexible circuit board 22 and the second light sources 6 are uniformly disposed on the third flexible circuit board 34 without interference between the first light sources 2 and the second light sources 6.

In an implementation, the second flexible circuit board 22 may be made of a light transparent material. Light emitted by the second light source 6 can reach the outside of the display screen 1 after passing through the second flexible circuit board 22 and the light conducting member 5 in sequence.

In an implementation, the second flexible circuit board 22 may contain a brightener to increase a brightness of the light signal that is emitted by the second light source 6, such that the brightness enhancement film can be omitted and space is saved.

Figure 14:
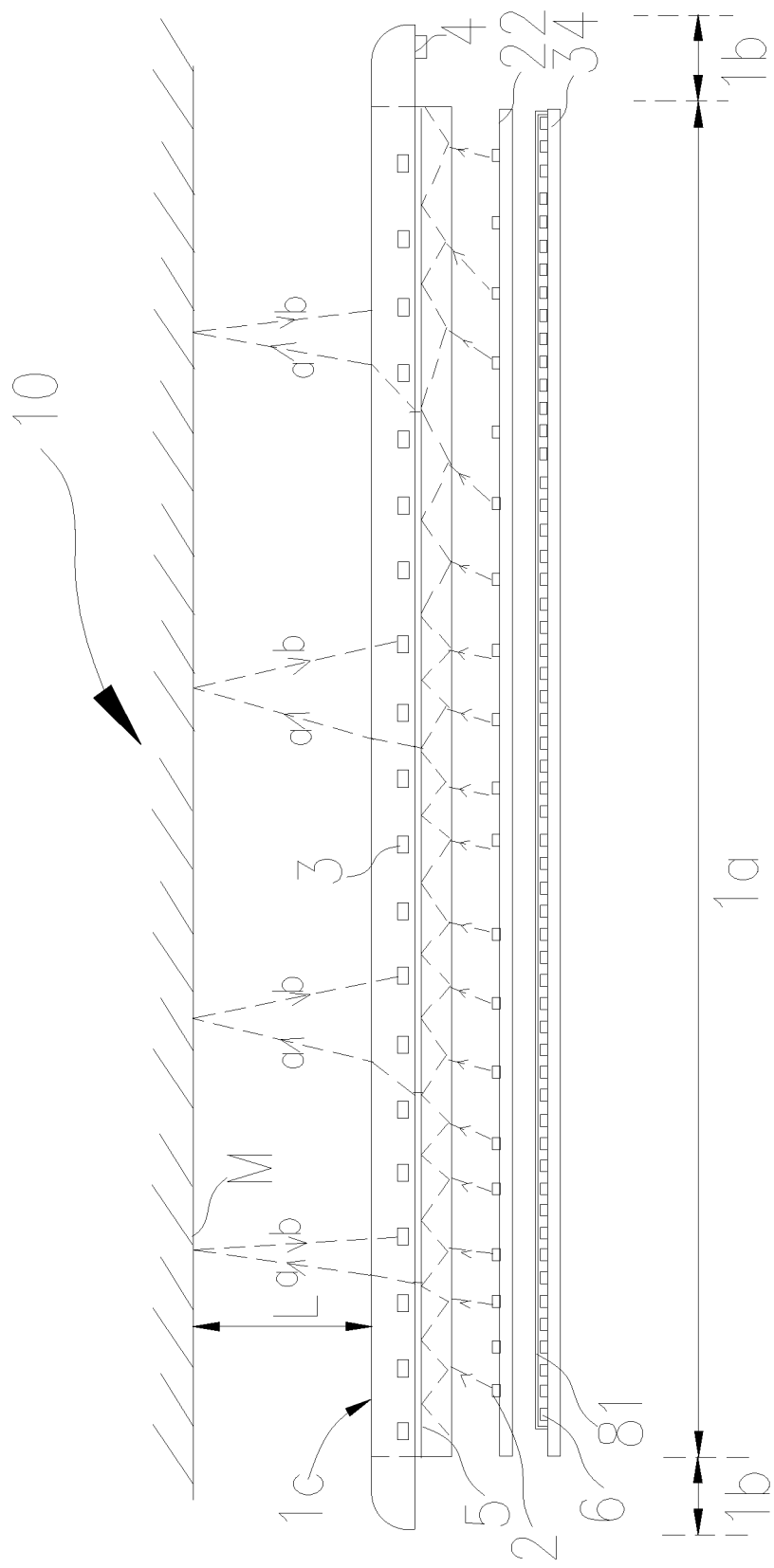
FIG. 14 is a schematic diagram of signal transmission and reception through a display screen assembly according to an implementation of the present disclosure.

In an implementation, referring to FIG. 14, the display screen assembly 10 further includes a filter cover 81. The filter cover 81 is disposed on the second light source 6. The filter cover 81 is used to block a detection signal a included in signals emitted by the second light source 6, such that no detection signal a is included in the signals emitted by the second light source 6 and interference with a detection result of the receiving element 3 can be avoided.

Figure 15:
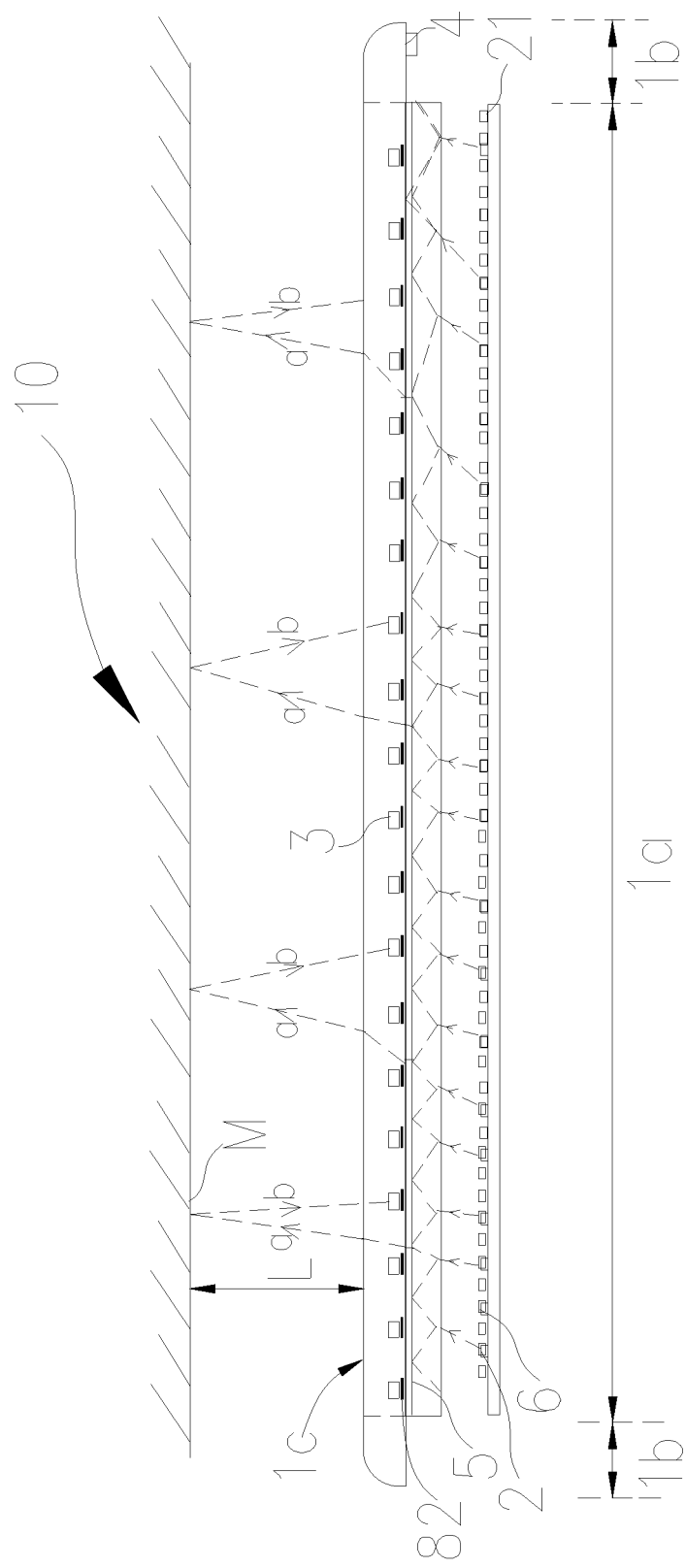
FIG. 15 is a schematic diagram of signal transmission and reception through a display screen assembly according to an implementation of the present disclosure.

In an implementation, referring to FIG. 15, the display screen assembly 10 further includes a light-shielding member 82. The light-shielding member 82 is located between the receiving element 3 and the first light source 2. The light-shielding members 82 is embodied as multiple light-shielding members 82. Each of the multiple light-shielding members 82 faces a corresponding one of the multiple receiving elements 3. The light-shielding member 82 is configured to prevent the detection signal a emitted by the first light source 2 from being directly transmitted toward the receiving element 3. An orthographic projection of the light-shielding member 82 on the display region 1a can cover the receiving element 3.

Figure 16:
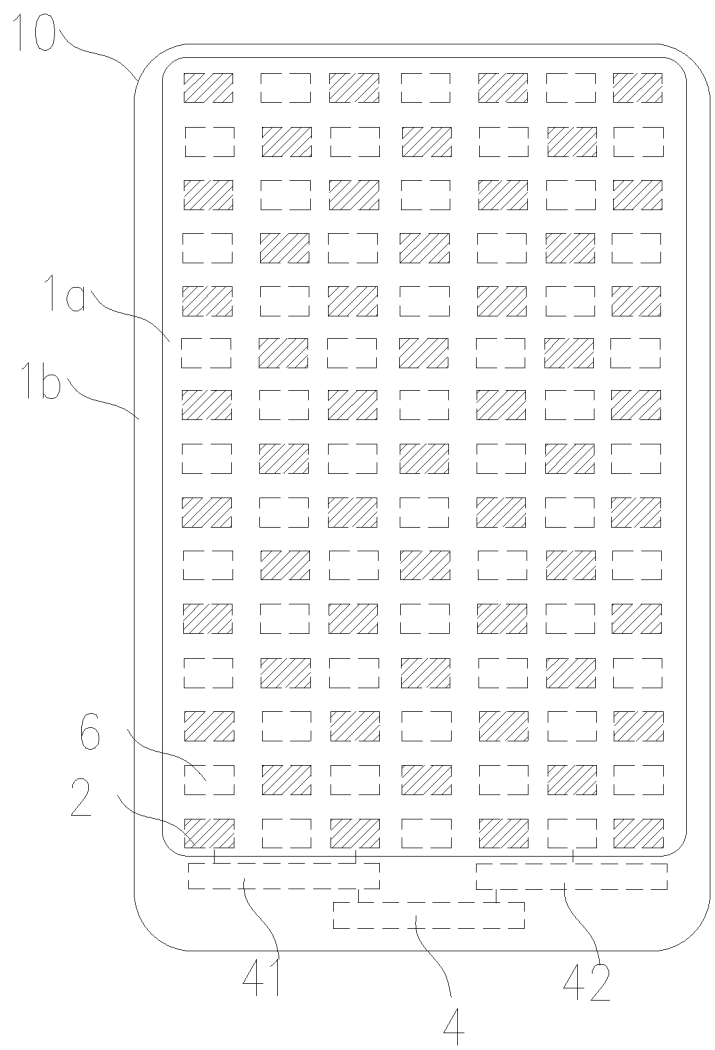
FIG. 16 is a top view of a display screen assembly according to an implementation of the present disclosure.

Referring to FIG. 16, the display screen assembly 10 further includes a first control circuit 41 and a second control circuit 42. The first control circuit 41 is electrically coupled with the multiple first light sources 2 and the receiving element 3. The processor 4 is electrically coupled with the first control circuit 41 and the second control circuit 42. The first control circuit 41 is configured to control the multiple first light sources 2 to transmit detection signals a and to control the receiving element 3 to receive the target signal b. The second control circuit 42 is electrically coupled with the multiple second light sources 6 and is configured to control the multiple second light sources 6 to light up or light off the display screen 1.

It is noted that, the first control circuit 41 is independent of the second control circuit 42. In other words, the first control circuit 41 can individually control to light up the first light source 2 (that is, control the first light source 2 to transmit the detection signal a), and the second control circuit 42 can individually control to light up the second light source 6 without interfering with the first light source 2. In an implementation, fingerprint recognition is independent from displaying of the display screen assembly 10. In the present disclosure, the first control circuit 41 controls the first light source 2 and the second control circuit 42 controls the second light source 6, as such, the first light source 2 can emit the detection signal independently in fingerprint identification, the second light source 6 can emit the second light signal b independently in displaying, and in displaying and fingerprint identification, the first light source 2 can emit the light signal for fingerprint recognition while the second light source 6 emits the light signal for displaying at the same time. In this way, different light signals are emitted for different scenarios such as displaying and fingerprint identification, and the functionality, flexibility, and stability of the electronic device 100 can be improved.

In other implementations, the first control circuit 41 and the second control circuit 42 can be multiplexed. In other words, the first control circuit 41 can control the first light source 2 to be lighted up or turned on and the second light source 6; alternatively, the second control circuit 42 can control the first light source 2 and the second light source 6 to be lighted up or turned on, and less control circuits are required.

In an implementation, referring to FIG. 3 and FIG. 4, the first light source 2 is configured to transmit a first electrical signal to the processor 4 upon transmission of the detection signal a. The processor 4 is configured to receive the first electrical signal and obtain first time point t1 at which the first electrical signal is received. The receiving element 3 is configured to transmit a second electrical signal to the processor 4 upon reception of the target signal b. The processor 4 is configured to receive the second electrical signal and obtain second time point t2 at which the second electrical signal is received. The processor 4 is configured to determine a distance between the detection object M and the display region 1a according to a difference between first time point t1 and second time point t2 and a wavelength of the detection signal a.

When the processor 4 detects that the distance L between the detection object M and the display region 1a is less than a preset value, the processor 4 controls the second light source 6 to turn off. When the processor 4 detects that the distance L between the detection object M and the display region 1a is greater than or equal to the preset value, the processor 4 controls the second light source 6 to turn on.

In an implementation, when the display region 1a is in a screen-on state (that is, the second light source 6 is on) and the distance L between the detection object M and the display region 1a is less than the preset value, the processor 4 controls the second light source 6 to turn off. The preset value may range from 3 cm to 5 cm for example. When the distance L between the detection object M and the display region 1a is less than the preset value, it indicates that the detection object M is close to the display region 1a, and the processor 4 may control the second light source 6 to turn off to reduce power loss and avoid misoperation. The above operations can be carried out in circumstances such as when a user answers a call without turning off the display region 1a, when the user puts the electronic device 100 in his pocket without turning off the display region 1a, etc. When the display region 1a is in an off-screen state (that is, the second light source 6 is off) and the distance L between the detection object M and the display region 1a is greater than the preset value, the processor 4 controls the second light source 6 to light up. As an option, the preset value can be 10 cm. When the distance L between the detection object M and the display region 1a is greater than the preset value, it indicates that the detection object M is away from the display region 1a, and the processor 4 can light up the second light source 6 to provide the user with a display environment, so as to facilitate the user to perform subsequent operations on the electronic device 100. The above operations can be carried out in a circumstance that the display region 1a is off while the user answers a call, etc.

It is noted that, the distance L between the detection object M and the display region 1a in the present disclosure refers to a distance between an outer surface of the detection object M and the light-emitting surface 1c of the display region 1a when the outer surface of the detection object M faces the display region 1a. The detection object M can be the human face, the human ear, or the like.

When the user is making a call, the controller 7 controls each of the multiple first light sources 2 to transmit the detection signal a and the first electrical signal. The first electrical signal is transmitted to the processor 4. The processor 4 receives the first electrical signal at first time point t1. The detection signal a can be 960 mn infrared light. The detection signal a exits from of the display region 1a and reaches the user's face or the user's ear to form the target signal b. The target signal b is reflected to the receiving element 3. When receiving the target signal b, the receiving element 3 generates the second electrical signal and transmits the second electrical signal to the processor 4. The processor 4 receives the second electrical signal at second time point t2. The processor 4 calculates the distance L between the user's face or the user's ear and the display region 1a according to (t2−t1) and the wavelength of the detection signal a. When the distance L between the user's face or ear and the display region 1a is greater than or equal to 10 cm, the processor 4 controls the second light source 6 to turn off. When the distance L between the user's face or ear and the display region 1a is less than 10 cm, the processor 4 controls the second light source 6 to light up.

Different from the previous implementation, in an implementation, the receiving element 3 transmits a third electrical signal to the processor 4 when receiving the target signal b, and the third electrical signal has an intensity corresponding to that of the target signal b. In this implementation, a greater intensity of the target signal b indicates a smaller loss of the target signal b during a transmission process and a third electrical signal with a greater intensity. The processor 4 can determine the distance L between the detection object M and the display region 1a according to the intensity of the third electrical signal received, and control the second light source 6 to turn on or turn off. In this implementation, the intensity of the target signal b decreases as the distance L between the detection object M and the display region 1a increases, and the intensity of the second electrical signal decreases as the intensity of the target signal b decreases.

When the processor 4 detects that the second light source 6 is off and the intensity of the second electrical signal is less than or equal to the preset value of the electrical signal, the distance L between the detection object M and the display region 1a is greater than or equal to the preset value, and the processor 4 may control the second light source 6 to light up. When the processor 4 detects that the second light source 6 is on and the intensity of the second electrical signal is greater than the preset value of the electrical signal, the distance L between the detection object M and the display region 1a is less than the preset value, and the processor 4 may control the second light source 6 to turn off.

Different from the above implementation, in an implementation, the processor 4 may control the second light source 6 to turn on or turn off according to change in the distance between the detection object M and the display region 1a. The processor 4 may control the second light source 6 to light up if the distance L between the detection object M and the display region 1a is gradually increased. The processor 4 may control the second light source 6 to turn off if the distance L between the detection object M and the display region 1a is gradually decreased.

Figure 17:
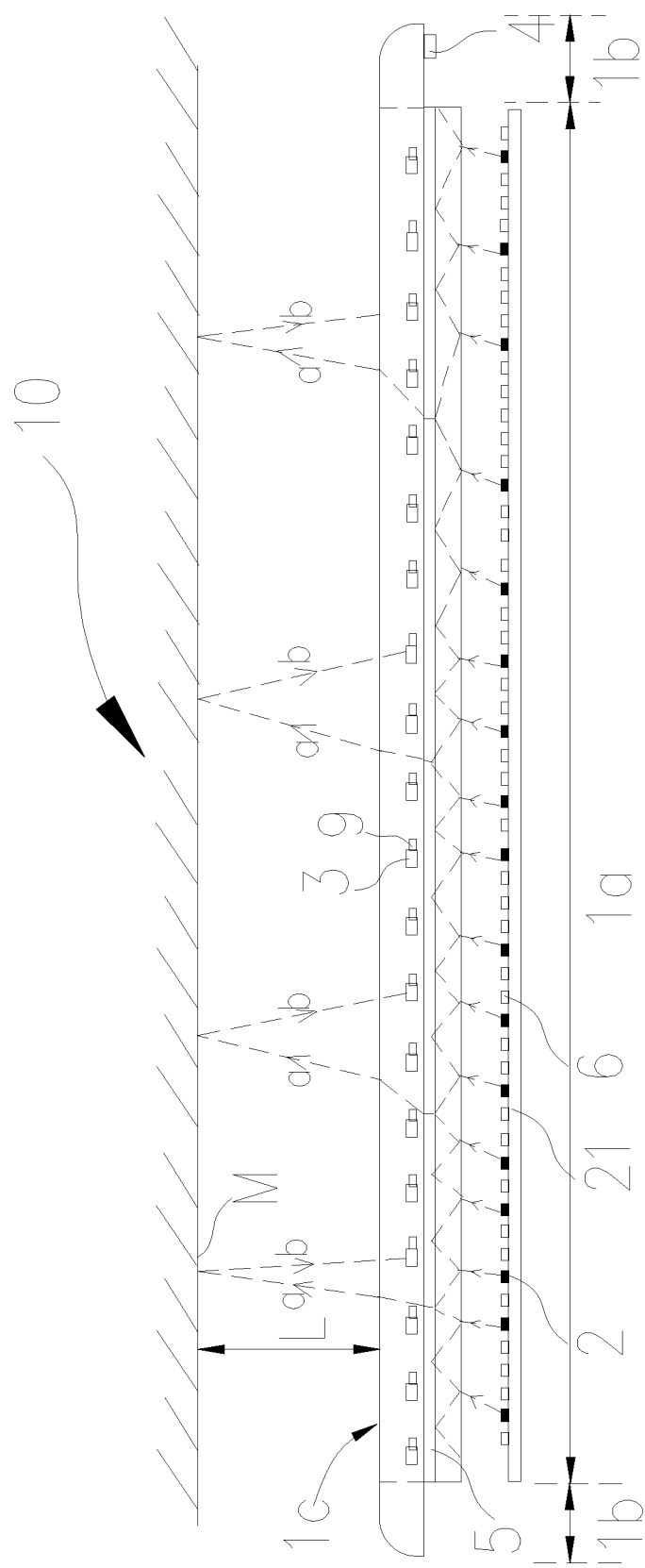
FIG. 17 is a schematic diagram of signal transmission and reception through a display screen assembly according to an implementation of the present disclosure.

In an implementation, referring to FIG. 17, the display screen assembly 10 further includes a switching element 9. The switching element 9 is electrically coupled with the processor 4 and the receiving element 3. When the first light source 2 emits the detection signal a, the processor 4 controls the switching element 9 to turn off to power off the receiving element 3. When the first light source 2 completes transmission of the detection signal a, the processor 4 turns on the switching element 9 to control the receiving element 3 to receive the target signal b.

In an implementation, the switching element 9 may be located in the display region 1a or the non-display region 1b. The switching element 9 may be a thin film transistor, or the like.

In an implementation, in order to prevent the detection signal a emitted by the first light source 2 from being directly received by the receiving element 3 without being reflected by the detection object M, the receiving element 3 is controlled to be powered off when transmitting the detection signal a, such that the receiving element 3 is unable to receive the detection signal a. When the receiving element 3 completes the transmission of the detection signal a, the receiving element 3 is powered on to receive the target signal b reflected by the detection object M, so as to reduce interference with the target signal b received by the receiving element 3 and avoid a reduction in detection efficiency.

Figure 18:
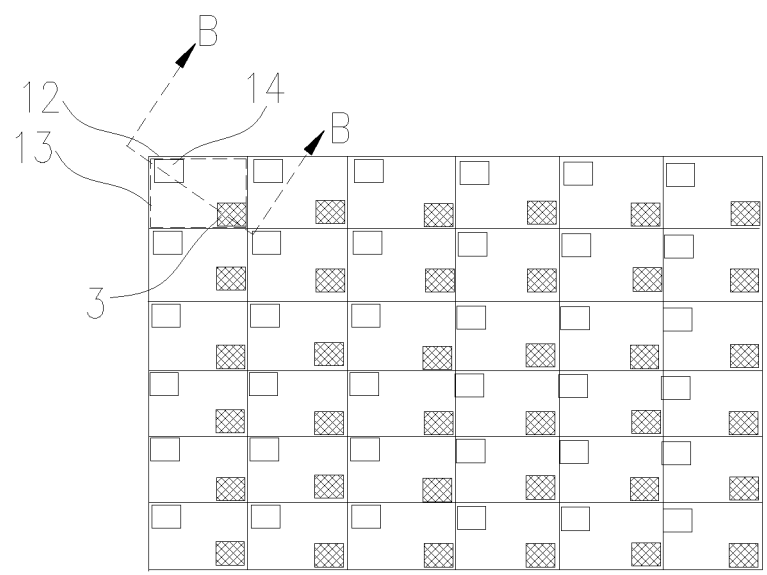
FIG. 18 is a top view of a pixel region of a display screen assembly according to an implementation of the present disclosure.

Referring to FIG. 18, the display region 1a includes a thin film transistor array substrate 12. The receiving element 3 is located in the thin film transistor array substrate 12.

In an implementation, referring to FIG. 18, the thin film transistor array substrate 12 includes multiple pixel regions 13 arranged in an array and multiple thin film transistors 14. Each thin film transistor 14 is located in a corresponding one pixel region 13. The receiving element 3 is embodied as multiple receiving elements 3. Each receiving element 3 is located in a corresponding one pixel region 13. The receiving element 3 is adjacent to or diagonally opposite to the thin film transistor 14 that is in the same pixel region 13 as the receiving element 3.

In an implementation, the pixel region 13 is rectangular. The thin film transistor 14 and the receiving element 3 can be diagonally distributed in the pixel region 13. In other implementations, the thin film transistor 14 and the receiving element 3 may be located at two adjacent corners of the pixel region 13.

The receiving element 3 and the thin film transistor 14 may be located on the same layer. The receiving element 3 may be spaced apart from the thin film transistor 14.

Since the receiving element 3 and the thin film transistor 14 are arranged in the same layer and the receiving element 3 is disposed in a gap between the thin film transistors 14, the receiving element 3 and the thin film transistor 14 do not have to be stacked in a direction perpendicular to the display screen 1, thereby reducing the thickness of the display screen assembly 10. Moreover, an electrical connection wire between the receiving element 3 and the first light source 2 can be provided in the same manufacturing process as a data line 111, a scan line 112, or an electrode layer of the thin film transistor 14, thereby simplifying the manufacturing process.

It is noted that the multiple receiving elements 3 can be distributed across the entire display region 1a. Alternatively, the multiple receiving elements 3 can also be distributed in a part of the display region 1a.

In this implementation, the display screen 1 can be an OLED display screen, a LCD display screen, or other display screens equipped with the thin film transistor array substrate 12.

In other implementations, the receiving elements 3 can be arranged in at least one of an anode layer, a light-emitting layer, and a cathode layer of the OLED display screen. The receiving elements 3 can be arranged in at least one of a liquid crystal layer and a color filter layer of the LCD display screen.

Figure 19:
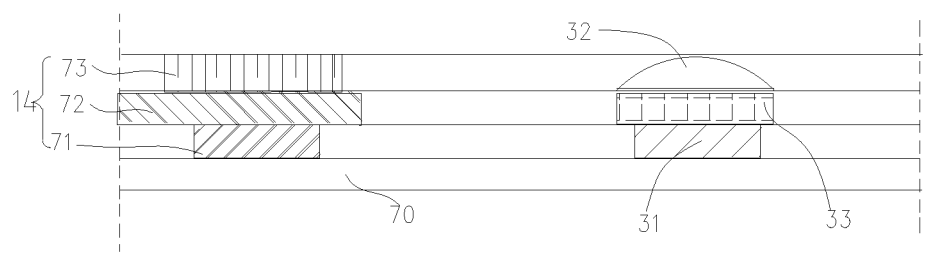
FIG. 19 is a cross-sectional view of the pixel region of the display screen assembly taken along line B-B in FIG. 18.

In an implementation, referring to FIG. 19, the receiving element 3 includes a photosensitive layer 31. The photosensitive layer 31 has a resistance varied with the intensity of the target signal b received. In other words, the receiving element 3 can be trigged, by a variation in the resistance of the photosensitive layer 31, to transmit the second electrical signal to the processor 4. The processor 4 detects the distance L between the detection object M and the display region 1a according to a difference between a transmission time of the first electrical signal and a reception time of the second electrical signal. Alternatively, the processor 4 can detect the intensity of the target signal b received by the photosensitive layer 31 according to a resistance value of the photosensitive layer 31. The processor 4 can detect the distance L between the detection object M and the display region 1a by detecting the intensity of the target signal b received by the photosensitive layer 31. In an implementation, the photosensitive layer 31 may include photosensitive materials such as lead sulfide (PbS), indium tin zinc oxide (ITZO), or indium gallium zinc oxide (IGZO).

Referring to FIG. 19, the thin film transistor 14 has a gate layer 71, an insulating layer 72, and a source-drain layer 73 stacked in sequence. The photosensitive layer 31 may be located in the same layer as at least one of the gate layer 71, the insulating layer 72, and the source-drain layer 73.

For example, referring to FIG. 19, the gate layer 71 is disposed on a substrate 70. The photosensitive layer 31 may be disposed on the substrate 70 and spaced apart from the gate layer 71. The insulating layer 72 covers the gate layer 71 and the photosensitive layer 31. The source-drain layer 73 is disposed on the insulating layer 72. The insulating layer 72 can be made of light transparent material to reduce the loss of optical signals in the insulating layer 72, such that more light signals can be projected to the photosensitive layer 31 through the insulating layer 72 and accordingly, more light signals can be received by the photosensitive layer 31 and the accuracy of fingerprint recognition can be improved.

In this implementation, the photosensitive layer 31 is embedded in the thin film transistor 14, as such, there is no need to stack the photosensitive layer 31 and the thin film transistor 14 in a thickness direction of the thin film transistor array substrate 12, thereby reducing the thickness of the display screen assembly 10.

When the target signal b is infrared light or near-infrared light, the photosensitive layer 31 may be made of a material with a special response to infrared light such as lead sulfide (PbS). When the target signal b is ultraviolet light or near ultraviolet light, the photosensitive layer 31 may be made of a semiconductor material such as ITZO, IGZO, or the like.

Further, referring to FIG. 19, the receiving element 3 also includes a condenser lens 32. The condenser lens 32 covers the photosensitive layer 31. The condenser lens 32 is configured to condense the target signal b to the photosensitive layer 31. The condenser lens 32 may be a convex lens, and a convex surface of the condenser lens 32 is away from the photosensitive layer 31. An orthographic projection of the condenser lens 32 on the photosensitive layer 31 covers the photosensitive layer 31.

In an implementation, the condenser lens 32 is spaced apart from the photosensitive layer 31. The condenser lens 32 is located at one side of the photosensitive layer 31 away from the light conducting member 5. The photosensitive layer 31 and the gate layer 71 may be located in the same layer. The condenser lens 32 may be located in the same layer as the source-drain layer 73.

The condenser lens 32 is disposed on the photosensitive layer 31, such that the condenser lens 32 can focus the target signal b to the photosensitive layer 31. The condenser lens 32 has a large light receiving area and can receive more light signals, and thus the detection efficiency can be improved.

Further, referring to FIG. 19, the receiving element 3 further includes a filter layer 33. The filter layer 33 may be located between the condenser lens 32 and the photosensitive layer 31. The filter layer 33 may be located in the same layer as the insulating layer 72. The filter layer 33 is used to pass through the target signal b and reflect visible lights. The filter layer 33 is used to filter the target signal b. The filter layer 33 has high permeability to the target signal b and high reflectivity to visible lights, so as to reduce an interference of external visible lights to the receiving element 3.

Figure 20:
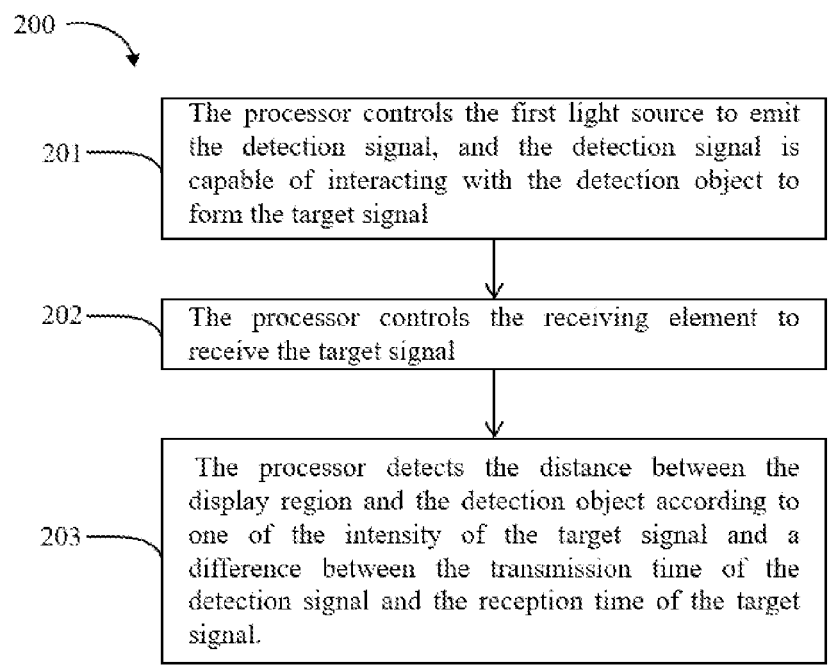
FIG. 20 is a flow chart of a method for controlling an electronic device according to an implementation of the present disclosure.

Referring to FIG. 20, combined with FIG. 1 and FIG. 19, the present disclosure also provides a method 200 for controlling an electronic device. The method 200 is applied to the electronic device 100 of any of the aforementioned implementations. The method 200 begins at block 201.

At block 201, the processor controls the first light source to emit the detection signal, and the detection signal is capable of interacting with the detection object to form the target signal.

At block 202, the processor controls the receiving element to receive the target signal.

At block 203, the processor detects the distance between the display region and the detection object according to one of the intensity of the target signal and a difference between the transmission time of the detection signal and the reception time of the target signal.

In an implementation, the first light source 2 transmits the first electrical signal to the processor 4 when transmitting the detection signal a. The processor 4 receives the first electrical signal and obtains first time point t1 at which the first electrical signal is received. The receiving element 3 transmits the second electrical signal to the processor 4 when receiving the target signal b. The processor 4 receives the second electrical signal and obtains second time point t2 at which the second electrical signal is received. The processor 4 may obtain the distance L between the detection object M and the display region 1a according to the difference between first time point t1 at which the first electrical signal is received and second time point t2 at which the second electrical signal is received, and in combined with the wavelength of the detection signal.

When the processor 4 detects that the distance L between the detection object M and the display region 1a is less than the preset value, the processor 4 controls the second light source 6 to turn off. When the processor 4 detects that the distance L between the detection object M and the display region 1a is greater than or equal to the preset value, the processor 4 controls the second light source 6 to turn on.

In an implementation, when the display region 1a is in a screen-on state (that is, the second light source 6 is on) and the distance L between the detection object M and the display region 1a is less than the preset value, the processor 4 controls the second light source 6 to turn off. The preset value may range from 3 cm to 5 cm for example. When the distance L between the detection object M and the display region 1a is less than the preset value, it indicates that the detection object M is close to the display region 1a, and the processor 4 may control the second light source 6 to turn off to reduce power loss and misoperation. The above operations can be carried out in circumstances such as when a user answers a call without turning off the display region 1a, when the user puts the electronic device 100 in his pocket without turning off the display region 1a, etc. When the display region 1a is in an off-screen state (that is, the second light source 6 is off) and the distance L between the detection object M and the display region 1a is greater than the preset value, the processor 4 controls the second light source 6 to light up. As an option, the preset value can be 10 cm. When the distance L between the detection object M and the display region 1a is greater than the preset value, it indicates that the detection object M is away from the display region 1a, and the processor 4 can light up the second light source 6 to provide the user with a display environment to facilitate the user to perform subsequent operations on the electronic device 100. The above operations can be carried out in a circumstance that the display region 1a is off while the user answers a call, etc.

Different from the previous implementation, in an implementation the receiving element 3 transmits a third electrical signal to the processor 4 when receiving the target signal b. In this implementation, a greater intensity of the target signal b indicates a third electrical signal with a greater intensity. The processor 4 can determine the distance L between the detection object M and the display region 1a according to the intensity of the third electrical signal received, and control the second light source 6 to turn on or turn off. In this implementation, the intensity of the target signal b decreases as the distance L between the detection object M and the display region 1a increases, and the intensity of the second electrical signal decreases as the intensity of the target signal b decreases.

When the processor 4 detects that the second light source 6 is off and the intensity of the second electrical signal is less than or equal to the preset value of the electrical signal, the distance L between the detection object M and the display region 1a is greater than or equal to the preset value, and the processor 4 may control the second light source 6 to light up. When the processor 4 detects that the second light source 6 is on and the intensity of the second electrical signal is greater than the preset value of the electrical signal, the distance L between the detection object M and the display region 1a is less than the preset value, and the processor 4 may control the second light source 6 to turn off.

The above description are preferred implementations of the present disclosure, and it is noted that various improvements and modifications can be made without departing from the principle of the application to those of ordinary skill in the art, and the improvement and the modification are also considered as the protection scope of the present disclosure.

What is claimed is:

1. A display screen assembly, comprising:
a display screen, comprising a display region for displaying images and a non-display region surrounding the display region;
a light conducting member facing the display region;
at least one first light source facing at least one surface of the light conducting member, wherein the at least one first light source is configured to emit a detection signal to the light conducting member, and the light conducting member is configured to diffuse the detection signal to allow the detection signal to pass through the display region, to interact with a detection object to form a target signal;
a plurality of second light sources configured to provide backlight for the display screen assembly;
a receiving element disposed in the display region and configured to receive the target signal; and
a processor electrically coupled with the at least one first light source and the receiving element, wherein the processor is configured to detect a distance between the display region and the detection object according to one of an intensity of the target signal and a difference between a transmission time of the detection signal and a reception time of the target signal,
wherein the display region comprises a plurality of pixel regions arranged in an array, each of the plurality of pixel regions has a light transparent portion and a black matrix surrounding the light transparent portion,
wherein the receiving element comprises a plurality of receiving elements, and
wherein the plurality of receiving elements, the light transparent portion, and the black matrix are on a same layer of the display region.

2. The display screen assembly of claim 1, further comprising a first flexible circuit board, wherein the first flexible circuit board faces at least one surface of the light conducting member, and the at least one first light source and the plurality of second light sources are spaced apart on the first flexible circuit board and electrically coupled with the first flexible circuit board.

3. The display screen assembly of claim 2, wherein
the light conducting member comprises a first surface and a second surface opposite to the first surface, the first surface facing the display region, and the second surface facing the first flexible circuit board; and
the at least one first light source and the plurality of second light sources are located on a side of the first flexible circuit board close to the light conducting member.

4. The display screen assembly of claim 3, wherein
each of the at least one first light source faces the light transparent portion.

5. The display screen assembly of claim 4, wherein
an orthogonal projection of the light transparent portion of each of the plurality of pixel regions on the first flexible circuit board covers a corresponding one of the at least one first light source.

6. The display screen assembly of claim 5, wherein
each of the plurality of receiving elements is disposed in the light transparent portion of a corresponding one of the plurality of pixel regions; and
an orthogonal projection of each of the plurality of receiving elements on the first flexible circuit board is spaced apart from a corresponding one of the at least one first light source.

7. The display screen assembly of claim 3, wherein
each of the at least one first light source is a mini LED or a micro LED for emitting infrared lights;
each of the plurality of second light sources is a mini LED or a micro LED for emitting visible lights; and
the light conducting member comprises a diffusion film and a brightness enhancement film stacked with the diffusion film, the diffusion film is configured to change a transmission angle of optical signals which are transmitted into the diffusion film.

8. The display screen assembly of claim 3, further comprising a first control circuit and a second control circuit, wherein
the first control circuit is electrically coupled with the at least one first light source and the receiving element and is configured to control the at least one first light source to emit the detection signal and to control the receiving element to receive the target signal; and the second control circuit is electrically coupled with the plurality of second light sources and is configured to control the plurality of second light sources to turn on or turn off the display screen.

9. The display screen assembly of claim 8, wherein the at least one first light source is configured to transmit a first electrical signal to the processor upon transmission of the detection signal, the processor is configured to receive the first electrical signal and obtain a first time point at which the first electrical signal is received;

the receiving element is configured to transmit a second electrical signal to the processor upon reception of the target signal, the processor is configured to receive the second electrical signal and obtain a second time point at which the second electrical signal is received; and the processor is configured to obtain a distance between the detection object and the display region according to a difference between the first time point and the second time point, to control the second control circuit to turn on or turn off the plurality of second light sources.

10. The display screen assembly of claim 8, wherein the receiving element is configured to transmit a third electrical signal to the processor upon reception of the target signal, wherein the third electrical signal has an intensity corresponding to that of the target signal; and the processor is configured to obtain a distance between the detection object and the display region according to the intensity of the third electrical signal received, to control the second control circuit to turn on or turn off the plurality of second light sources.

11. The display screen assembly of claim 2, wherein the light conducting member comprises a first surface, a second surface opposite to the first surface, and a side surface connected between the first surface and the second surface, the first surface facing the display region, the side surface facing the first flexible circuit board; and the at least one first light source and the plurality of second light sources are located on a side of the first flexible circuit board close to the light conducting member.

12. The display screen assembly of claim 11, wherein the light conducting member is a light guide plate, the side surface defines a plurality of grooves, each of the at least one first light source is located in a corresponding one of the plurality of grooves, and each of the plurality of grooves has an arc inner wall.

13. The display screen assembly of claim 1, further comprising a second flexible circuit board and a third flexible circuit board, wherein the second flexible circuit board faces at least one surface of the light conducting member;

the at least one first light source comprises a plurality of first light sources, which are located on the second flexible circuit board and electrically coupled with the second flexible circuit board;

the third flexible circuit board is located to a side of the second flexible circuit board away from the light conducting member, and the plurality of the second light sources are located on the third flexible circuit board and electrically coupled with the third flexible circuit board; and each of the plurality of the second light sources faces a gap between corresponding adjacent two of the plurality of first light sources.

14. The display screen assembly of claim 13, wherein the second flexible circuit board is made of a light transparent material, light emitted by each of the plurality of second light sources is capable of reaching the outside of the display screen after passing through the second flexible circuit board and the light conducting member in sequence.

15. The display screen assembly of claim 1, the display screen assembly further comprises a filter cover, wherein the filter cover is disposed on the plurality of second light sources and configured to filter out the detection signal in signals emitted by the plurality of second light sources.

16. The display screen assembly of claim 1, further comprising a switching element, wherein the switching element is electrically coupled with the processor and the receiving element, and wherein the processor is configured to turn off the switching element to power off the receiving element, upon transmission of the detection signal by the at least one first light source; and the processor is configured to turn on the switching element to control the receiving element to receive the target signal, upon completion of the transmission of the detection signal by the at least one first light source.

17. The display screen assembly of claim 1, further comprising a light-shielding member, the light-shielding member is located between the receiving element and the at least one first light source and faces the receiving element, and the light-shielding member is configured to prevent the detection signal emitted by the at least one first light source from being directly transmitted toward the receiving element.

18. The display screen assembly of claim 1, wherein the display region comprises a plurality of pixel regions and a plurality of thin film transistors;

each of the plurality of thin film transistors is located in a corresponding one of the plurality of pixel regions, each of a plurality of receiving elements is located in a corresponding one of the plurality of pixel regions; and the receiving element is adjacent to or diagonally opposite to the thin film transistor that is in the same pixel region as the receiving element.

19. An electronic device, comprising a housing and a display screen assembly covered on the housing, wherein the display screen assembly comprises:

a display screen, comprising a display region for displaying images and a non-display region surrounding the display region;

a light conducting member facing the display region;

at least one first light source facing at least one surface of the light conducting member, wherein the at least one first light source is configured to emit a detection signal to the light conducting member, and the light conducting member is configured to diffuse the detection signal to allow the detection signal to pass through the display region, to interact with a detection object to form a target signal;

a plurality of second light sources, wherein one or more of the plurality of second light sources are located between two adjacent first light sources, and the second light sources are configured to provide backlight for the display screen assembly;

a receiving element disposed in the display region and configured to receive the target signal;

a processor electrically coupled with the at least one first light source and the receiving element; and a switching element electrically coupled with the processor and the receiving element, wherein the processor is configured to:
- detect a distance between the display region and the detection object according to one of an intensity of the target signal and a difference between a transmission time of the detection signal and a reception time of the target signal;
- turn off the switching element to power off the receiving element upon transmission of the detection signal by the at least one first light source; and
- turn on the switching element to control the receiving element to receive the target signal upon completion of the transmission of the detection signal by the at least one first light source.

20. A method for controlling an electronic device, comprising:
- controlling at least one first light source of the electronic device to emit a detection signal, the detection signal is capable of interacting with a detection object to form a target signal;
- controlling a receiving element of the electronic device to receive the target signal; and
- detecting a distance between a display region of a display screen of the electronic device and the detection object according to one of an intensity of the target signal and a difference between a transmission time of the detection signal and a reception time of the target signal, wherein the display region comprises a plurality of pixel regions arranged in an array, each of the plurality of pixel regions has a light transparent portion and a black matrix surrounding the light transparent portion, wherein the receiving element comprises a plurality of receiving elements, and wherein the plurality of receiving elements, the light transparent portion, and the black matrix are on a same layer of the display region.

* * * * *